US010863034B2

(12) United States Patent
Bianco et al.

(10) Patent No.: US 10,863,034 B2
(45) Date of Patent: Dec. 8, 2020

(54) METHOD AND SYSTEM FOR PROCESSING INTERACTIVE VOICE RESPONSE INPUT IN A CALL SETUP MESSAGE

(71) Applicant: Vonage Business Inc., Atlanta, GA (US)

(72) Inventors: Itay Bianco, Tel-Aviv (IL); Brian Pante, Lake Como, NJ (US); Yuval Golan, Rishon Le-zion (IL)

(73) Assignee: Vonage Business Inc., Atlanta, GA (US)

( * ) Notice: Subject to any disclaimer, the term of this patent is extended or adjusted under 35 U.S.C. 154(b) by 923 days.

(21) Appl. No.: 14/810,687

(22) Filed: Jul. 28, 2015

(65) Prior Publication Data

US 2017/0034358 A1    Feb. 2, 2017

(51) Int. Cl.
*H04M 7/00* (2006.01)
*H04M 3/493* (2006.01)
*H04L 29/06* (2006.01)

(52) U.S. Cl.
CPC ...... *H04M 7/0036* (2013.01); *H04L 65/1006* (2013.01); *H04L 65/1069* (2013.01); *H04M 3/4935* (2013.01); *H04M 3/4936* (2013.01)

(58) Field of Classification Search
None
See application file for complete search history.

(56) References Cited

U.S. PATENT DOCUMENTS

| | | | | |
|---|---|---|---|---|
| 8,229,090 B2* | 7/2012 | Poi | ...................... | H04M 3/5166 370/352 |
| 8,737,272 B2* | 5/2014 | Wengrovitz | ...... | H04L 29/06027 370/260 |
| 2004/0120502 A1* | 6/2004 | Strathmeyer | ........... | H04M 3/51 379/265.01 |
| 2006/0251236 A1* | 11/2006 | Peters | ................. | H04M 3/5166 379/265.01 |
| 2008/0130842 A1* | 6/2008 | Johri | ................... | H04M 3/2281 379/88.04 |
| 2008/0260137 A1* | 10/2008 | Poi | ...................... | H04M 3/5166 379/212.01 |
| 2009/0262920 A1* | 10/2009 | Henrikson | .............. | H04L 67/16 379/221.09 |
| 2011/0158397 A1* | 6/2011 | Simoes | ............... | H04M 3/5166 379/265.02 |

* cited by examiner

*Primary Examiner* — Christopher T Wyllie
(74) *Attorney, Agent, or Firm* — Moser Taboada; Joseph Pagnotta

(57) ABSTRACT

A method and apparatus for processing IVR input in a call setup message are provided herein. The method includes receiving at an IVR system a call setup message including information associated with one or more data fields; parsing the information included in the call setup message; and directing the call based on the information included in the call setup message.

15 Claims, 5 Drawing Sheets

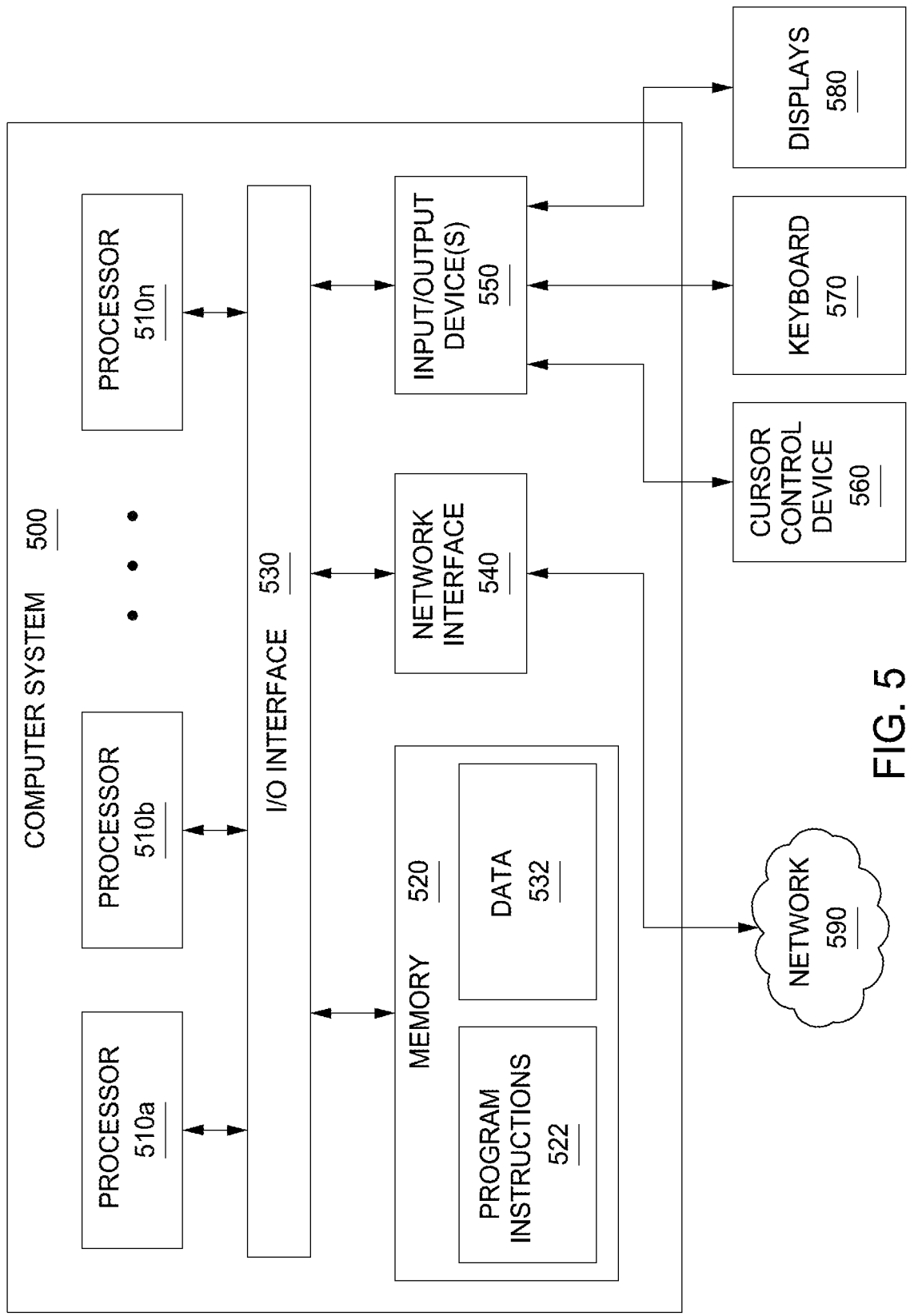

METHOD AND SYSTEM FOR PROCESSING INTERACTIVE VOICE RESPONSE INPUT IN A CALL SETUP MESSAGE

BACKGROUND

Field

Embodiments of the present invention generally relate to methods and systems for processing interactive voice response (IVR) input in a call setup message for immediate redirection.

Description of the Related Art

IVR servers allow a computer to interact with callers through the use of voice and dual-tone multi-frequency (DTMF) tones input via a computing device. For example, the IVR system may ask a caller in what language the caller would like to communicate. When the caller responds, the IVR provides menu options in the specified language in order to perform tasks such as verifying the caller's identity, routing the caller to a party who may assist the caller, and the like. The IVR may ask for a PIN, a conference code number, or ask the caller to answer a series of questions that direct the caller through menus of the IVR that navigate the caller to a correct extension. The IVR may require a caller to press DTMFs in order to progress through the menus of the IVR or answer questions verbally.

Currently, IVR information may be stored in a dial string of a contact and as the user device interacts with the IVR, the IVR input (i.e., DTMF tones, etc.) is transmitted when the IVR indicates it is ready for the next input. The iterative transmission of requests and inputs wastes processing cycles and creates more opportunity for packet loss.

Therefore, there exists a need in the art for an improved method and system for processing IVR input in a call setup message.

SUMMARY

A method and system for processing IVR input in a call setup message for immediate redirection are provided herein. In some embodiments, a method for processing IVR input in a call setup request for immediate redirection may include receiving at an IVR system a call setup message including information associated with one or more data fields; parsing the information included in the call setup message; and directing the call based on the information included in the call setup message.

In some embodiments, a system for processing IVR input in a call setup message for immediate redirection may include a header parser configured to receive at an IVR system a call setup message including information associated with one or more data fields; and parse the information included in the call setup message; and a call router configured to direct the call based on the information included in the call setup message.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 depicts a computer system that can be utilized in various embodiments of the present invention to implement the computer and/or the display, according to one or more embodiments of the invention.

Figure 1:
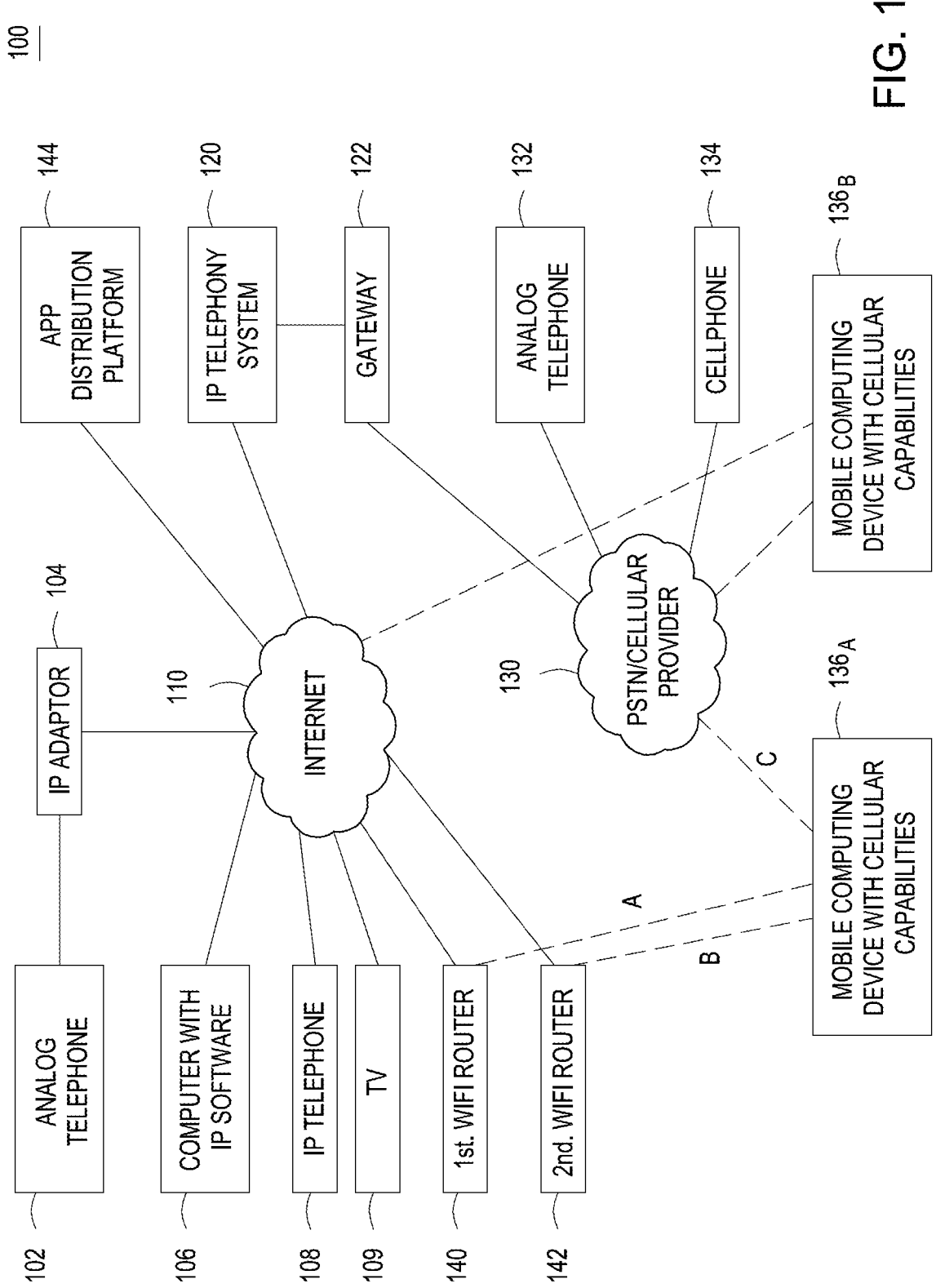
FIG. 1 depicts a block diagram of a telecommunication network, according to one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a method and apparatus for processing IVR input received in a call setup message for immediate redirection. In some embodiments, an IVR system may publish one or more data fields that may be included in a call setup message to the IVR system. These data fields may be used by the IVR system to automatically route the caller appropriately without iteratively asking for the information. For example, an IVR system for a bank may publish that it accepts a caller's location and an extension. A SIP server provides the data fields to the caller's device, which in turn, automatically retrieves the information associated with the data fields from the device without manual intervention from the caller. For example, a mobile app on the caller's device may retrieve the caller's location via a geolocation app on the caller's device. The mobile app may retrieve the extension from for example, a predefined field in a contact entry for the called IVR system. The calling device may initiate a call, using for example a SIP INVITE message to the IVR and send the retrieved information in a header of the INVITE message. The IVR system parses the information from the header. The IVR converts the information into input to the IVR menus and automatically redirects the call through the IVR menus until all of the received information is processed. In the present example, the IVR redirects the call to the appropriate branch of the bank based on the received location and further redirects the call to a specific extension in the branch using the received extension. As used herein, redirecting the call, or directing the call, includes forwarding, transferring, navigating, or advancing to the next IVR menu.

In another example, an IVR system may request a preferred language, an area code, and an ID number to direct an incoming call. The IVR may publish as accepted data fields a preferred language, an area code, and an ID number; however, the calling device only transmits the preferred language and the area code to the IVR system. The IVR uses the preferred language and area code to direct the call. After processing the preferred language and area code, the IVR system asks for the ID number. As such, the IVR system uses the received information to progress through the IVR menus, then asks for any additional information still needed to direct the call.

In yet another example, the IVR publishes that it supports direct DTMF sequencing. The calling device, when initiating the call to the IVR, adds the DTMF sequence to the header of the call setup message. The IVR system parses the DTMF fields and immediately progresses through the menus as if the caller had iteratively entered the DTMFs. As such, the IVR system directs the call without waiting for input from the user device to navigate the IVR menus.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Some exemplary embodiments described below are with respect to a mobile Voice over Internet Protocol (VOIP) telecommunication app. However, one skilled in the art will readily recognize from the following description that any native application may be used in embodiments consistent with the present invention without departing from the principles of the disclosure described herein.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

In some embodiments, telephony communications are effected over a packet-based data network. Signaling that is conducted in the packet-based data network is preferably executed using Session Initiation Protocol (SIP). SIP is a popular communication protocol for initiating, managing and terminating media (e.g., voice, data and video) sessions across packet-based data networks that typically use the Internet Protocol (IP), of which Voice Over Internet Protocol (VOIP) is an example. The details and functionality of SIP can be found in the Internet Engineering Task Force (IETF) Request for Comments (RFC) Paper No. 3261 entitled, "SIP: Session Initiation Protocol" herein incorporated in its entirety by reference. Of course, while SIP is a preferred protocol for establishing communications over a data network, other signaling protocols could also be used to perform embodiments of the present invention.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 or a television 109 to place and receive IP based telephone calls, and to access other IP telephony systems (not shown). The computer 106 may be a personal computer (PC), a tablet device, a gaming system, and the like. In some instances, the soft-phone client could be assigned its own telephone number. In other instances, the soft-phone client could be associated with a telephone number that is also assigned to an IP telephone 108, or to a telephone adapter 104 that is connected to one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities $136_A$ (e.g., a smartphone) is capable of establishing a first wireless data connection A with a first wireless access point 140, such as a wireless local area network (WLAN) based on the Institute of Electrical and Electronics Engineers' (IEEE) 802.11 and 802.13 standards router. The first wireless access point 140 is coupled to the Internet 110. Thus, the mobile computing device $136_A$ can establish a VOIP telephone call with the IP telephony system 120 via a path through the Internet 110 and the first wireless access point 140.

FIG. 1 also illustrates that the mobile computing device $136_A$ can establish a second wireless data connection B with a second wireless access point 142 that is also coupled to the Internet 110. Further, the mobile computing device $136_A$ can establish either a third wireless data connection C via a packet-switched network provided by a cellular service provider 130 using its cellular telephone capabilities, or establish a voice based session telephone call via a circuit-switched network provided by a cellular service provider 130. The mobile computing device $136_A$ could also establish a VoIP telephone call with the IP telephony system 120 via the second wireless connection B or the third wireless connection C.

Although not illustrated in FIG. 1, the mobile computing device $136_A$ may be capable of establishing a wireless data connection to a data network, such as the Internet 110, via alternate means. For example, the mobile computing device $136_A$ might link to some other type of wireless interface using an alternate communication protocol, such as the wireless local area network (WLAN) based on the Institute of Electrical and Electronics Engineers' (IEEE) 802.11 and 802.13 standards.

Similarly, mobile computing device with cellular capabilities $136_B$ may also be coupled to internet 110 and/or cellular service provider 130. In some embodiments, mobile computing device $136_B$ may be connected to internet 110 via a wireless local area network (WLAN) based on the Institute of Electrical and Electronics Engineers' (IEEE) 802.11 and 802.13 standards connection, and the like, and can also establish a VOIP telephone call with the IP telephony system 120 similar to mobile computing device $136_A$. In embodiments of the present invention, communications environment 100 may be used to establish voice based or data based telecommunications sessions between mobile computing device $136_A$ and mobile computing device $136_B$, depending on various criteria associated with each of the mobile computing devices, as will be described below in more detail.

In the embodiments described above, a device may act as a mobile telephony device once it is configured with appropriate application software that may be downloaded from an app distribution platform 144. For example, mobile computing device $136_A$ may download a VOIP mobile app from app distribution platform 144 and install the VOIP mobile app locally making the app a native application running on mobile computing device $136_A$.

Figure 2:
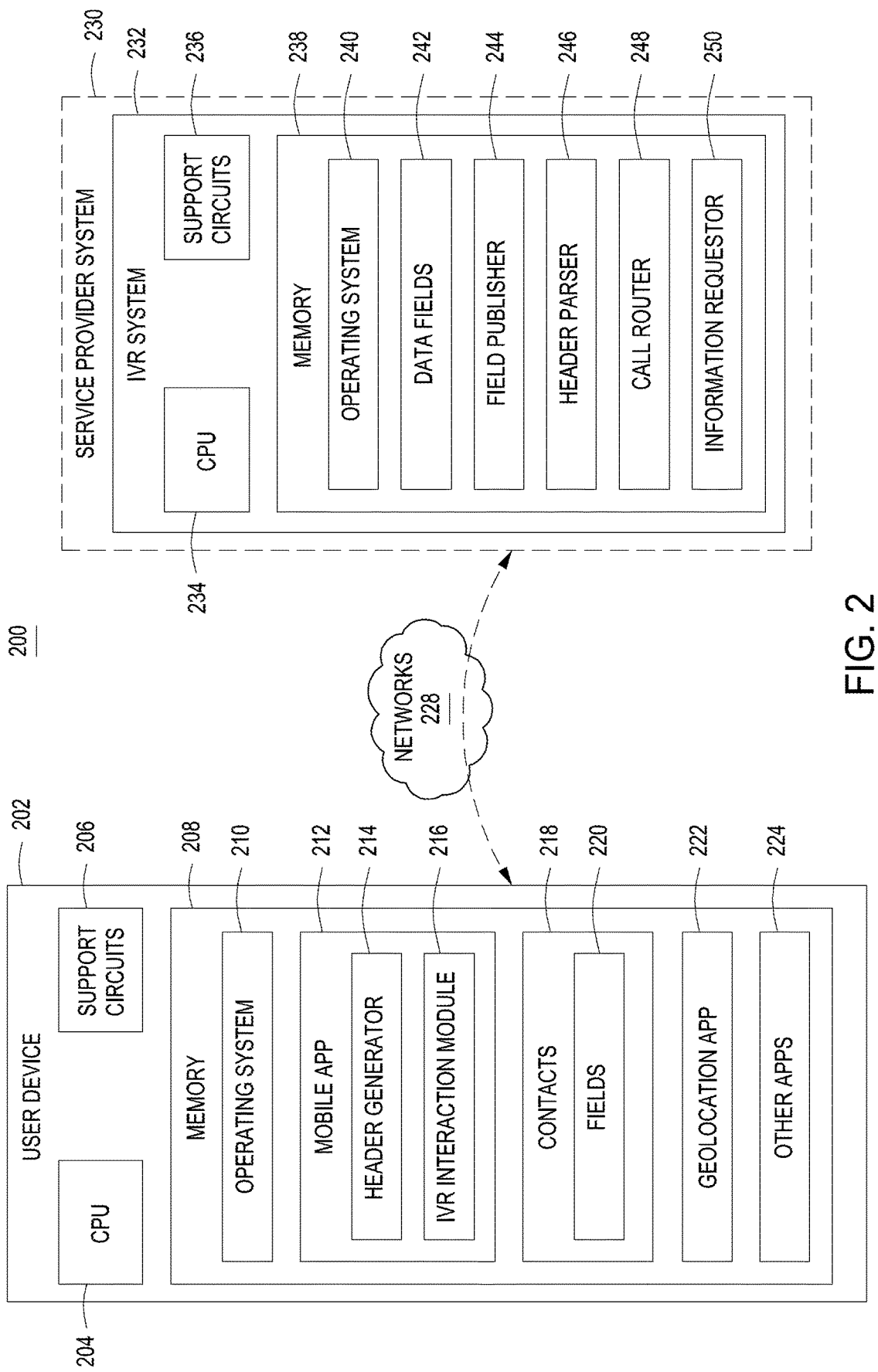
FIG. 2 depicts a block diagram of a system for processing IVR input in a call setup message for immediate redirection, according to one or more embodiments of the invention.

FIG. 2 depicts a block diagram of a system 200 for processing IVR input in a call setup message for immediate redirection, according to one or more embodiments. The system 200 comprises a user device 202, and service provider system 230 communicatively coupled via networks 228. In some embodiments, user device 202 may be a mobile computing device (e.g., 136A) associated with a user, and service provider system 230 may be IP telephony system 120 as described above in FIG. 1 that hosts and maintains an IVR system 232. Although the IVR system 232 is shown as a hosted IVR at a service provider system 230, the IVR system 232 may alternatively be installed at a customer premises, installed in a PSTN, or located remote from the service provider system 230 and in communication with the service provider system 230 over networks 228.

User device 202 may comprise a Central Processing Unit (CPU) 204, support circuits 206, and a memory 208. The CPU 204 may comprise one or more commercially available microprocessors or microcontrollers that facilitate data processing and storage. The various support circuits 206 facilitate the operation of the CPU 204 and include one or more clock circuits, power supplies, cache, input/output device and circuits, and the like. The memory 208 comprises at least one of Read Only Memory (ROM), Random Access Memory (RAM), disk drive storage, optical storage, removable storage and/or the like. In some embodiments, the memory 208 comprises an operating system 210, a mobile app 212, such as a mobile telecommunication app, contacts 218, a geolocation app 222, and one or more other apps 224 that may be used by the mobile app 212 to retrieve information.

The operating system (OS) 210 generally manages various computer resources (e.g., network resources, file processors, and/or the like). The OS 210 is configured to execute operations on one or more hardware and/or software modules, such as Network Interface Cards (NICs), hard disks, virtualization layers, firewalls and/or the like. Examples of the OS 210 may include, but are not limited to, various versions of LINUX, MAC OSX, BSD, UNIX, MICROSOFT WINDOWS, IOS, ANDROID and the like. In some embodiments, OS 210 may include an application programming interface (API) that can be used to access user device information and features (such as, for example, by mobile app 212).

In some embodiments, the mobile app 212 is a VoIP app that provides over-the-top (OTT) VoIP telephony services to an end-user. In some embodiments, an end-user may download the mobile app 212 from service provider system 230, or from an app distribution system 144, and install the mobile app 212 on their device. Although the mobile app 212 is described herein as a separate stand-alone application, in some embodiments the mobile app 212 may be integrated into OS 210, and may use existing API calls provided by the OS 210 to access or control various features of user device 202.

In some embodiments mobile app 212 may include a header generator 214 and an IVR interaction module 216. The IVR interaction module 216 may be used to facilitate or otherwise provide communication services such as, for example, voice or video calling, SMS messages, or various other types of communication services. In some embodiments, the IVR interaction module 216 may encrypt all, or a portion of, the information sent to remote servers/systems over network 228, or otherwise transmit the information in a secure format.

The networks 228 comprise one or more communication systems that connect computers by wire, cable, fiber optic and/or wireless link facilitated by various types of well-known network elements, such as hubs, switches, routers, and the like. The networks 228 may include an Internet Protocol (IP) network (such as internet 110 of FIG. 1), a public switched telephone network (PSTN) (such as the PSTN network of PSTN provider 130 of FIG. 1), or other mobile communication networks, and may employ various well-known protocols to communicate information amongst the network resources.

The IVR system 232 may include a Central Processing Unit (CPU) 234, support circuits 236, and memory 238. The CPU 234 may comprise one or more commercially available microprocessors or microcontrollers that facilitate data processing and storage. The various support circuits 236 facilitate the operation of the CPU 234 and include one or more clock circuits, power supplies, cache, input/output circuits, and the like. The memory 238 comprises at least one of Read Only Memory (ROM), Random Access Memory (RAM), disk drive storage, optical storage, removable storage and/or the like. In some embodiments, the memory 238 comprises an operating system 240, one or more data fields 242, a field publisher 244, a header parser 246, a call router 248, and an information requestor 250. The operating system 240 generally manages various computer resources (e.g., network resources, file processors, and/or the like). The operating system 240 is configured to execute operations on one or more hardware and/or software modules, such as Network Interface Cards (NICs), hard disks, virtualization layers, firewalls and/or the like. Examples of the operating system 240 may include, but are not limited to, various versions of LINUX, MAC OSX, BSD, UNIX, MICROSOFT WINDOWS, IOS, ANDROID and the like.

In some embodiments, when a REGISTER request is sent from an IVR system 232 to a SIP server, field publisher 244 identifies one or more data fields 242 that are available for publishing. The field publisher 244 may include (i.e., publish) data fields 242 with the SIP REGISTER request. These published data fields 242 indicate what information may be passed back to and understood by the IVR system 232 to redirect a call. Examples of published data fields 242 include, but are not limited to a conference PIN, a telephone extension, credit card information, a telephone number to which a call may be returned, a zip code, area code, an account number, answers to security questions, such as the last four digits of a social security number, mother's maiden, name, favorite sports team, and the like. The published data fields 242 inform the header generator 214 what information to pass to the IVR system 232 with the call setup request. In some embodiments, when user device 202 places a call to the IVR system 232, the SIP server may transmit the published data fields 242 in response to a SIP INVITE message from user device 202. In some embodiments, the field publisher 244 publishes the data fields 242 upon receipt of a SIP INVITE message when user device 202 initiates a call to the IVR system 232. The published data fields 242 are stored by IVR interaction module 216 as fields 220 in a contact entry for the IVR system in contacts 218. In some embodiments, the IVR system 232 may not publish any fields and user device 202 may transmit all relevant data in a header with the SIP INVITE message. In such embodiment, the IVR system 232 uses what information it understands to redirect the call and discards the rest.

When a call is made from a user device 202 to an IVR system 232, the header generator 214 parses the published data fields and retrieves information associated with the published data fields in order to build a header with the retrieved information. For example, the IVR system 232 may be a bank with branches around the world. A traditional banking IVR system may respond to a caller with, "For English, say English For Spanish, say Spanish.", followed by asking for the caller's zip code, and finally asking for the caller's account number. Instead of the iterative process of asking for information and waiting for a response, the field publisher 244 may publish that is accepts a language, a location, and an account number. The IVR system 232 may use this information to direct the call to a bank location local to the user, identify the account number for the user, and direct the caller to the extension of a person who can communicate in the provided language.

In the present example, the header generator 214 parses the published data fields and identifies that the IVR system 232 accepts a language, a location, and an account number. The header generator 214 may retrieve the location of the user device 202 using, for example, the geolocation app 222. The header generator 214 may then retrieve the account number from, for example, contact information in contact 218 or from another app 224, such as a banking app on user device 202 that has the account number of the user stored. The header generator 214 may retrieve the language from the default language setting on the user device 202, using for example, an application programming interface (API) call to the OS 210. The header generator 214 then may send the information as one or more new headers with a new re-INVITE after the first INVITE finishes or send an UPDATE message updating the initial INVITE with the new header (s). In some embodiments, the header generator 214 may wait until the call to the IVR system 232 is established and send the information in an INFO message to the IVR system 232. The header may be any header understood by the IVR system 232 such as a JSON or an XML based header with the information.

The header parser 246 parses the header to extract the received information. The received information may include all of the information associated with the published fields, less than all of the published fields, or more than the published fields. The header parser 246 determines what information is received. The call router 248 uses the information to route the call. For example, if the IVR is a conference call system that publishes the fields of meeting identifier and name, but the header includes a language and a meeting identifier, the call router 248 discards the language information because language is not one of the published fields and therefore may not be understood or may not be needed by the IVR system 232. The IVR system 232 however may need a user to state their name before entering the conference. Because additional information is required, the information requestor 250 transmits a message to the user device 202 requesting the user of the user device 202 to state the user's name. The user of user device 202 may either verbally state their name or select an audio file of the user's name which the header generator 214 sends back to the IVR in, for example, an INFO message. When the call router 248 has all of the information required by the IVR system 232, the call router 248 redirects the call before placing the caller into the call.

In another example, where the IVR system 232 may not publish any data fields 242, the header generator 214 may access the contact 218 for information about the IVR system from previous interactions. For example, during a previous call to, for example, a bank, the IVR system may have asked for a user location, an account number, and an extension. This information may have been stored by the IVR interaction module 216 as fields 220 after a prior call. The IVR interaction module 216 may convert the requests from the IVR system 232 using for example, speech to text and store the text as fields 220. The header generator 214 may build the header based on the fields 220, again retrieving the information using APIs, from contact information stored with the contact 218, using another app 224, or may request the user of user device 202 to enter the information manually. The mobile app 212 may transmit the generated header with an INVITE message to the IVR, in an UPDATE message, a NOTIFY message, or in an INFO message. The header parser 246 of the IVR system 232 parses the header and the call router 248 directs the call appropriately based on the received information. Although the present disclosure refers to transmitting information in one or more SIP headers, those skilled in the art will understand any type of messages may be used to transmit information to the IVR system 232.

Figure 3:
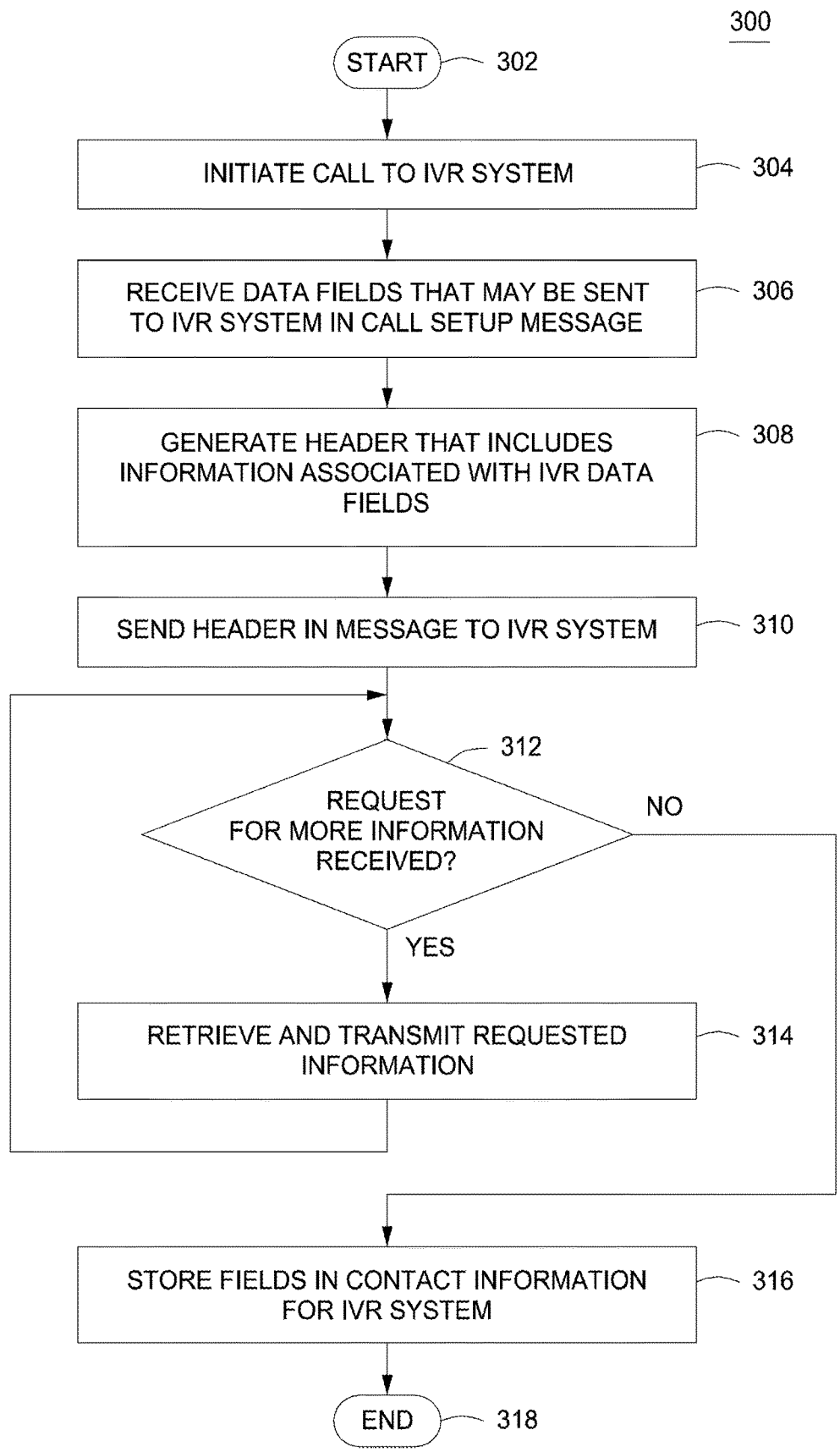
FIG. 3 depicts a flow diagram of a method for providing IVR input in a call setup message for immediate redirection, according to one or more embodiments of the invention.

FIG. 3 depicts a flow diagram of a method 300 for providing IVR input in a call setup message for immediate redirection, according to one or more embodiments. The method 300 starts at step 302 and proceeds to step 304. At step 304, a call is placed to an IVR system from a user device. For example, a SIP INVITE message may be sent to the IVR system from the user device.

At step 306, one or more data fields may be received indicating what information may be sent to the IVR system, such that the IVR system may automatically redirect the caller without iteratively requesting information.

At step 308, a header is generated to send with the call setup message. The header generator 214 retrieves information associated with the received data fields. For example, if the IVR system publishes that a location may be sent to the IVR system, information is obtained from the geolocation app 222 using application programming interface (API) calls to the geolocation app 222. If the IVR system publishes that a language may be sent to the IVR system, an API call may be made to the operating system 210 to retrieve the default language setting on the device. If a PIN, DTMF tones, an extension, and the like are published, these values may be retrieved from the contact listing for the IVR system, from a table on user device 202 or from another app 224 on the user device. The information may also be retrieved from a user input on a user interface of user device 202.

If the IVR system did not publish any data fields, the header generator may access the contact information for the IVR system from a list of contacts, and retrieve what fields were sent to the IVR system during a previous call. Alternatively, the header generator may obtain a plurality of information and include all of the information in the header.

At step 310, the header is transmitted to the IVR system in a message. In some embodiments, if a SIP INVITE message was already sent, a new re-INVITE may be sent. In some embodiments, if a SIP INVITE was already sent, an UPDATE message may be sent with the generated header.

At step 312, it is determined whether a request was received from the IVR system requesting additional information. If addition information was requested, the method 300 proceeds to step 314 where the information is retrieved and transmitted in, for example an INFO message and the method proceeds to step 312, and iterates until no additional information is requested at which time the method proceeds to step 316.

At step 316, the information published and/or requested by the IVR system is stored as contact information for the IVR system, which may be used to generate headers in future calls to the IVR system. The method 300 ends at step 318.

Figure 4:
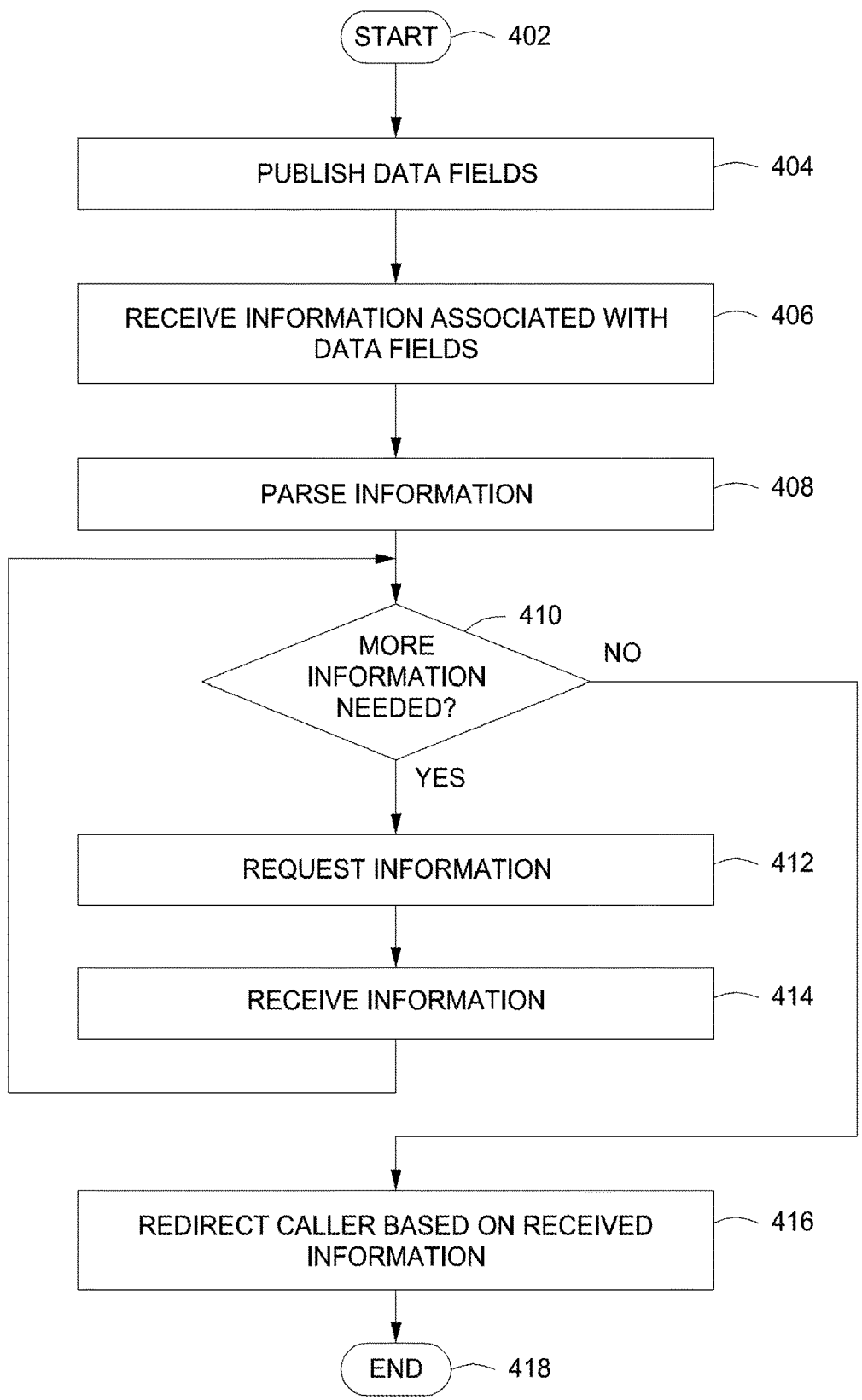
FIG. 4 depicts a flow diagram of a method for processing IVR input in a call setup message for immediate redirection, according to one or more embodiments of the invention.

FIG. 4 depicts a flow diagram of a method 400 for processing IVR input in a call setup message for immediate redirection, according to one or more embodiments of the invention. The method 400 starts at step 402 and proceeds to step 404.

At step 404, the IVR publishes what data fields may be sent to the IVR system. These data fields are used as input by the IVR system to immediately redirect the caller. In some embodiments, the IVR publishes the one or more fields when the IVR registers with a SIP server. In some embodiments, the IVR publishes the data fields in response to an INVITE message.

At step 406, the IVR system receives the information associated with the data fields that may be used for immediately routing the call. The received information may include some, all or more than is needed by the IVR system to redirect the caller.

At step 408, the message in which the information was transmitted is parsed. The information may arrive in one or more headers and/or in one or more messages. Each message(s) may include some, all or more than the information needed by the IVR system.

At step 410, it is determined whether all of the information needed by the IVR has been received in the one or more headers and the one or more messages. For example, if an IVR system for a bank published and received the data fields of a language, a location, and an account number and received all of the information for the published fields, the IVR system for the bank may still not have all of the information needed to route the caller appropriately. For example, the bank may need to know if the caller is interested in learning about loans, having a question about their bank balance, calling to transfer funds, or the like. Alternatively, the one or messages may not include all of the information associated with the published data fields. If more information is needed, then at step 412, the information is requested. If a language is specified, the request may be in the received language preference.

At step 414, the additional information is received, in for example, an INFO message. The steps 410 through 414 may repeat until all of the required information is received by the IVR system.

At step 416, the caller is redirected based on the received information. The method 400 ends at step 418.

FIG. 5 depicts a computer system 500 that can be utilized in various embodiments of the present invention to implement the computer and/or the display, according to one or more embodiments.

Various embodiments of method and apparatus for organizing, displaying and accessing contacts in a contact list, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement the method 400 as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the operations and methods described above, such as the operations described with respect to FIG. 2 and the methods illustrated by the flowcharts of FIG. 3 and FIG. 4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for processing interactive voice response (IVR) input in a call setup request, comprising:
   receiving at an IVR system a call setup message including information associated with one or more data fields;
   parsing the information included in the call setup message; and
   directing a call based solely on the information included in the call setup message.

2. The method of claim 1, further comprising transmitting a message including one or more data fields that are accepted by the IVR system.

3. The method of claim 1, wherein directing comprises routing the call through one or more IVR menus of the IVR system.

4. The method of claim 1, wherein the information associated with the one or more data fields is received in one or more headers of the call setup message.

5. The method of claim 1, wherein the data fields include at least one of a location, a personal identification number (PIN), a telephone extension, a user name, a conference PIN, credit card information, a telephone number to which a call can be returned, a zip code, an area code, an account number, or one or more answers to security questions.

6. The method of claim 1, further comprising:
   identifying additional information required by the IVR system to route the call;
   sending a request for the additional information;
   receiving the additional information;
   parsing the additional information; and
   further directing the call based on the additional information.

7. The method of claim 6, wherein the additional information is provided by a user.

8. The method of claim 6, further comprising receiving the additional information in one of a SIP INVITE, SIP UPDATE, SIP NOTIFY, or SIP INFO message.

9. A system for processing interactive voice response (IVR) input in a call setup message, comprising:
- a header parser configured to receive at an IVR system a call setup message including information associated with one or more data fields; and parse the information included in the call setup message; and
- a call router configured to direct a call based solely on the information included in the call setup message.

10. The system of claim 9, further comprising a field publisher configured to transmit a message including one or more data fields that are accepted by the IVR system.

11. The system of claim 9, wherein directing comprises routing the call through one or more IVR menus of the IVR system.

12. The system of claim 9, wherein the information associated with one or more data fields is received in one or more headers of the call setup message.

13. The system of claim 9, wherein the data fields include at least one of a location, a personal identification number (PIN), a telephone extension, a user name, a conference PIN, credit card information, a telephone number to which a call can be returned, a zip code, an area code, an account number, or one or more answers to security questions.

14. The system of claim 9, further comprising an information requestor configured to
- identify additional information required by the IVR system to route the call;
- send a request for the additional information
- receive the additional information;
- parse the additional information; and
- further direct the call based on the additional information.

15. The system of claim 14, wherein the additional information is received in one of a SIP INVITE, SIP UPDATE, SIP NOTIFY, or SIP INFO message.

* * * * *